United States Patent [19]

Silverglate

[11] Patent Number: 4,770,514
[45] Date of Patent: Sep. 13, 1988

[54] COLLIMATING COMPOUND CATOPTRIC IMMERSION LENS

[76] Inventor: David Silverglate, 7777 Glenhaven Rd., Soquel, Calif. 95073

[21] Appl. No.: 933,377

[22] Filed: Nov. 21, 1986

[51] Int. Cl.$^4$ .............................................. G02B 17/02
[52] U.S. Cl. ................................... 350/443; 350/432
[58] Field of Search ................................. 350/443, 432

[56] References Cited

U.S. PATENT DOCUMENTS 2,215,900  9/1940  Bitner .................................. 350/443
3,914,309  10/1975  Swensen ............................. 250/239

*Primary Examiner*—John K. Corbin
*Assistant Examiner*—Rebecca D. Gass
*Attorney, Agent, or Firm*—James & Franklin

[57] ABSTRACT

The lens includes a transparent body having a central section and a peripheral section. The central section has a surface with a truncated elliptical curvature. The peripheral section has an inner refracting surface and an outer reflecting surface. The inner refracting surface has a diverging truncated conical shape. The outer reflecting surface has a parabolic shape.

7 Claims, 4 Drawing Sheets

COLLIMATING COMPOUND CATOPTRIC IMMERSION LENS

The present invention relates to lenses, and, more particularly, to a collimating compound catoptric immersion lens designed for use as an opto-switch, reflective object sensor, optocoupler or optoisolator.

Many current optical applications require an inexpensive and efficient collimating lens for use in conjunction with a light source or a photodetector. Preferably, the lens should be able to be fabricated from a molded plastic body within which a light emitting diode or photodetector is immersed. The lens should be capable of efficiently collimating light emanating from the source or focusing collimated light on the detector.

In general, the present invention relates to a compound catoptric lens in which the elliptical central section operates on light at relatively small angles from the optical/mechanical axis to collimate light emanating from an immersed emitter or focus collimated light on an immersed detector. A peripheral section, including a conical inner refracting surface and a parabolic outer reflecting surface operates on light at a wider angle, collimating the light emanating from an immersed emitter or focusing collimated light on an immersed detector.

It is, therefore, a prime object of the present invention to provide a collimating compound catoptric immersion lens.

It is another object of the present invention to provide a collimating compound catoptric immersion lens which includes a central section with a truncated elliptical curvature.

It is another object of the present invention to provide a collimating compound catoptric immersion lens which includes a peripheral section having an inner refracting surface and an outer reflecting surface.

It is another object of the present invention to provide a collimating compound catoptric immersion lens for use with an immersed emitter such as an LED.

It is another object of the present invention to provide a collimating compound catoptric immersion lens for use with an immersed photodetector.

It is another object of the present invention to provide a collimating compound catoptric immersion lens which can be utilized as a component in an optoswitch, optical sensor, optocoupler or optoisolator.

In accordance with the present invention, a collimating compound lens means is provided having a transparent body. The body has a central section and a peripheral section. The central section has a surface with a substantially truncated elliptical curvature. The peripheral section has an inner refracting surface and an outer reflecting surface. The inner refracting surface has a substantially diverging truncated conical shape. The outer reflecting surface has a substantially parabolical shape, preferably a tilted parabolic shape.

A light source, such as an LED, may be immersed in the body along the optical axis. Alternatively, a photodetector may be immersed within the body.

In accordance with another aspect of the present invention, apparatus for detecting light emitted from a source is provided. The apparatus comprises first and second collimating compound lenses. Each lens has a body with a central section and a peripheral section. The central section has a surface with a substantially truncated elliptical curvature. The peripheral surface has an inner refracting surface and an outer reflecting surface. The inner refracting surface has a truncated conical shape. The outer reflecting surface has a substantially parabolic shape. Light source means are immersed in the first lens means body on the optical axis. Light detector means is immersed in the second lens means body on the optical axis.

The apparatus may further comprise a reflective surface. The reflective surface is situated between the first lens means and the second lens means.

To these and to such other objects which may hereinafter appear, the present invention relates to a collimating compound catoptric immersion lens, as described in the following specification and recited in the annexed claims, taken together with the accompanying drawings, wherein like numerals refer to like parts and in which:

Figure 1:
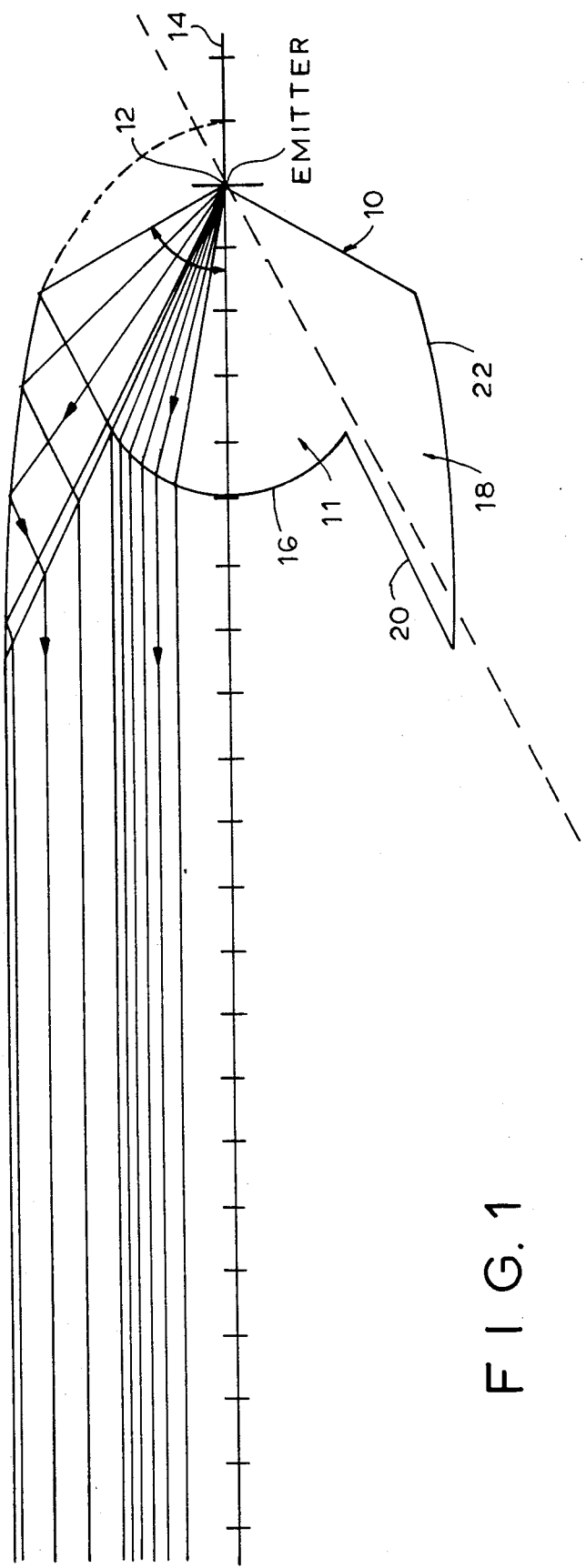
FIG. 1 illustrates a lens body collimating in accordance with the present invention including an immersed emitter.

FIG. 1 illustrates a collimating emitter in accordance with the present invention which may be used for long-distance signalling, fiberoptic "launch" coupling, and far-field illumination. The emitter includes a transparent molded plastic body 10 into which a light emitting diode (LED) 12 is wholly immersed. The shape of the central part of body 10 causes small angle (with respect to the optical/mechanical axis 14) light rays to be collimated. Larger angle light rays hit one surface of the peripheral part of the body 10 and are internally reflected, then hit a second surface of the peripheral part where they are refracted and finally exit body 10 and are also collimated. The maximum angle at which light rays leaving the source 12 are collimated can be chosen depending upon the angular radiant characteristics of the emitter or the emitter/cup. This angle can be chosen to be as much as 90° or more.

The central portion 11 of body 10 has a surface 16 with a truncated ellipsoid shape. Light source 12 is situated at the farther of the two focii of the ellipsoid. The ellipsoid is truncated at or before the point where total internal reflection occurs. The eccentricity of the ellipsoid is a function of the refractive indices of the plastic and air.

The peripheral portion 18 has an inner refractive surface 20 and an outer reflective surface 22. The inner refractive surface 20 has the shape of a diverging truncated cone whose apex would be centered at point source 12 and actually begins where the ellipsoid of surface 16 is truncated. The outer reflecting surface 22 is half of a parabolic curve tilted at an angle to the optical/mechanical axis 14 (dependent on the index of refraction of the body and the truncation plane of the ellipsoid) and rotated about the optical/mechanical axis 14. The outside surface 22 may be coated with a reflecting material to improve reflections when incident angles are less than the critical angle.

Figure 2:
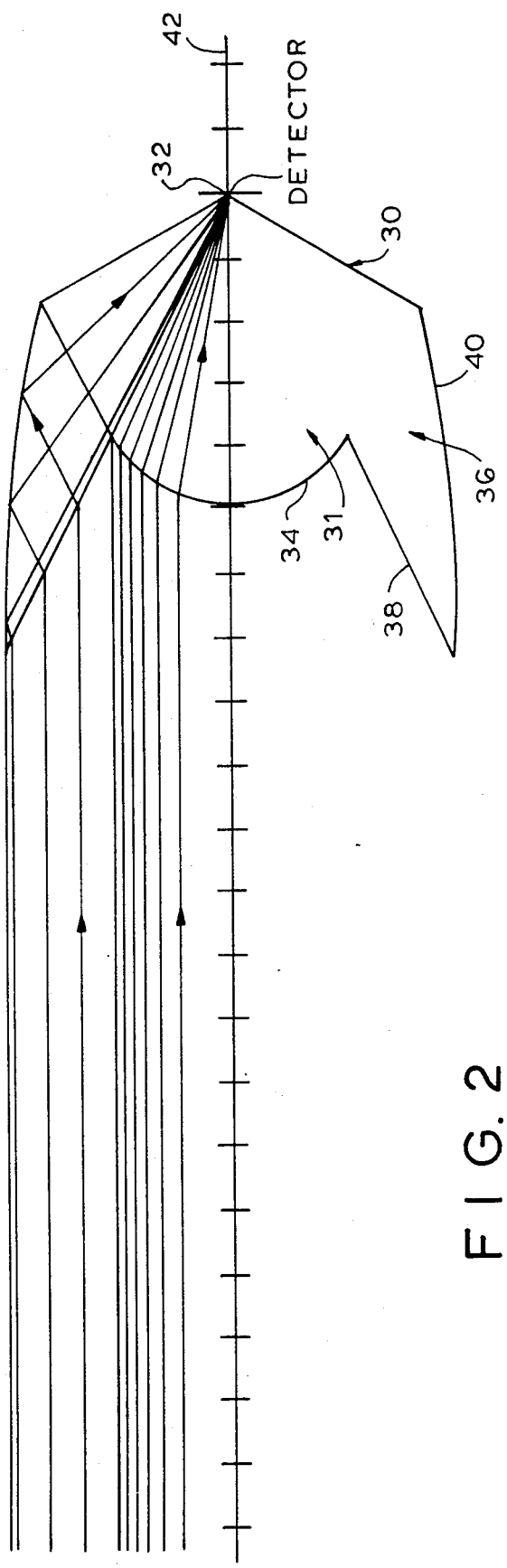
FIG. 2 illustrates a collimating lens body in accordance with the present invention including an immersed detector.

FIG. 2 shows a collimating detector in accordance with the present invention designed for use in long distance, high resolution sensing, free-field communications and fiberoptic "landing" applications. The configuration of the detector body, generally designated 30, is substantially the same as that of body 10 and is also composed of a transparent molded plastic material. A photodetector of conventional design is immersed in body 30 and point 32.

Body 30 has a central portion 31 with a surface 34 of a truncated ellipsoid shape, similar to surface 16 of body 10. Further, body 30 has a peripheral section 36, similar to section 18 of body 10, with an inner refracting surface 38 and an outer reflecting surface 40. Inner refracting surface 38 has a diverging truncated conical shape with the apex at point 32, which is the farther of the two focii of the ellipsoid of surface 34. Surface 40 is a reflective surface having a parabolic curve tilted at an angle to the optical/mechanical axis 42, similar to surface 22 of body 10. Surface 40 may be coated with a reflecting material.

Figure 3:
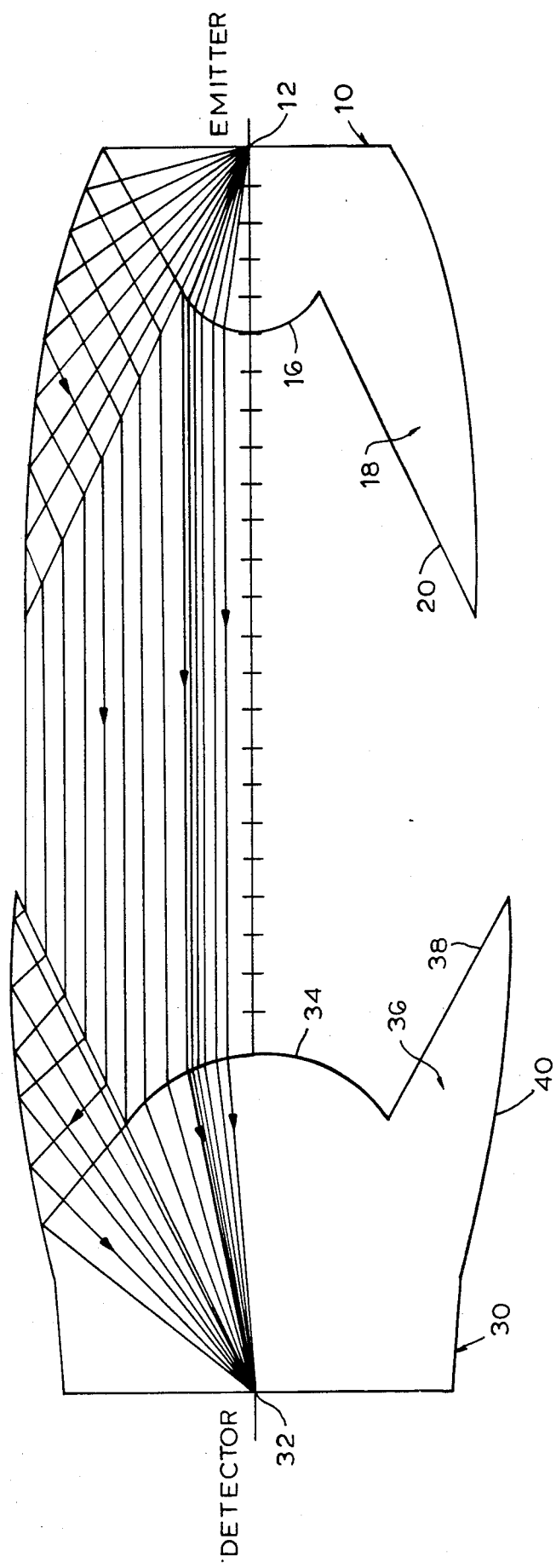
FIG. 3 illustrates coupled collimating and emitter and detector means in accordance with the present invention.

FIG. 3 shows one practical application of a combination of the emitter and detector means, illustrated in FIGS. 1 and 2, respectively. The device illustrated in FIG. 3 can be used as a slotted opto-switch, a reflective object sensor, an opto-coupler or an optoisolator in a very inexpensive and efficient manner.

The device includes an emitter means and detector means which are electrically and physically isolated from each other in two separate molded plastic transparent optical lens bodies 10 and 30. The shape of the emitter means is designed such that light rays leaving the emitter at point 12 at small angles to the optical/mechanical axis are refracted at the central front surface 16 of body 10 and exit in collimated rays so as to be incident on the central front surface 34 of the detector body 30. Larger angle light rays undergo an internal reflection on the surface 22 and are then refracted at surface 20 so as to exit body 10 in collimated rays incident on the preferred front surface 38 of the detector body 30. All rays hitting the detector body are focused either directly or through the internal reflection on detector 32.

The detector body 30 can be designed such that the light rays are focused on the detector 32 in a narrow-like cone. The advantage of this design is that the light leaving the emitter in all directions will be efficiently coupled to the detector. This makes for a high coupling efficiency opto-switch or opto-isolator. The arrangement can be such that the emitter's wide output angle can converge in a narrow incident light cone on the detector.

Figure 4:
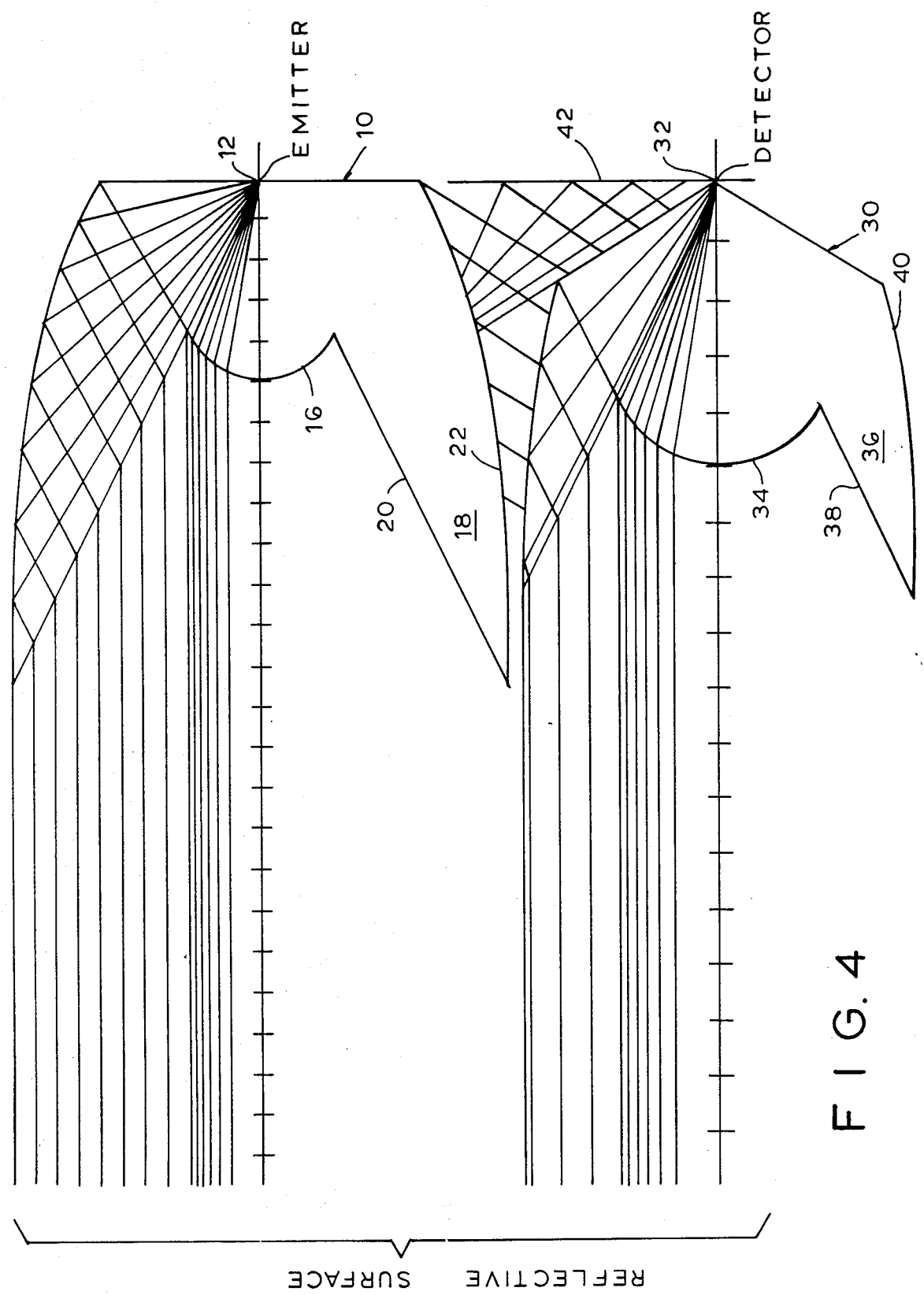
FIG. 4 illustrates a collimating emitter/detector pair in accordance with the present invention immersed in a doublet lens/reflector means.

FIG. 4 illustrates a collimating emitter/detector pair immersed in a doublet lens package. This configuration can be used for high resolution far-field illumination and detection, and far-field beamed interrupt off of a distant retroflective surface. In this case, body 10 and body 30 are immersed in a plastic optical doublet lens package 42. The package becomes a double humped doublet.

The emitter means can be designed to collect as much flux exiting the LED 12 as possible and focus it on a distant spot, in a collimated beam. The detector means is focused on the same distant spot, but its body can be designed for shallow angle rays to be incident on the detector keeping refraction losses low. The emitter and detector means are attached by molding, gluing or locking same together with an external snap, slide, case or frame. The emitter and detector packages may be complete along their axis of revolution or sliced and merged together.

A barrier 42 can also be immersed in the package between the emitter and the detector means to decrease the cross-talk between them. Some cross-talk (DC only) can help in some applications but keep the detector "active" with a DC bias provided by the neighboring emitter. The emitter sends collimated light to a distant spot and the illuminated spot then retroflects the light back into the detector part of the doublet and this light strikes the detector. It is helpful if the spot is made of retroflective material in the beam interrupt application. The size of the emitter and the detector are an important variable in the resolution of the system. Other variables include distance from the emitter and/or detector to the lens surface, ratio of the emitter and/or the detector size to the lens diameter, and percent internal reflection at the first lens surface before truncating.

It should now be appreciated that the present invention relates to a collimating compound catoptric immersion lens which can be used singularly as an emitter or detector, or in a pair for switching, coupling, scanning, or isolating applications. Each lens has an ellipsoid shaped central portion and a peripheral portion with an inner refracting surface and an outer reflecting surface. The inner refracting surface has a truncated conical shape and the outer reflecting surface has a tilted parabolic shape. The lens may have an LED or a photodetector immersed therein to form an inexpensive and efficient package.

While only a limited number of preferred embodiments of the present invention have been disclosed herein for purposes of illustration, it is obvious that many variations and modifications could be made thereto. It is intended to cover all of these variations and modifications which fall within the scope of the present invention, as defined by the following claims:

I claim:

1. Apparatus for detecting light emitted from a source comprising first and second collimating compound lens means, each having a body with a central seciton and a peripheral section, said central section having a surface with the shape of a substantially truncated ellipsoid and said peripheral section having an inner refracting truncated conical surface and an outer reflecting substantially parabolic surface, light source means immersed in said first lens means body on the optical axis and light detector means immersed in said second lens means body on the optical axis.

2. The lens of claim 1, wherein said parabolic shape is a tilted parabolic shape.

3. The apparatus of claim 1, further comprising a reflective surface between said first and said second means.

4. Apparatus for generating and collimating light comprising a light source and collimating compound lens means having a transparent solid body with an optical axis, said body having a central section and a peripheral section, said central section having a surface with substantially the shape of a truncated ellipsoid and said peripheral section having an inner refracting surface and an outer reflecting surface, said inner refracting surface having a substantially diverging truncated conical shape and said outer reflecting surface having a substantially parabolic shape, said light source being wholly immersed in said body, along the optical axis.

5. The apparatus of claim 4 wherein said light source is a light emitting diode.

6. The apparatus of claim 4, wherein said parabolic shape is a tilted parabolic shape.

7. The apparatus of claim 4, wherein said ellipsoid has a focus substantially at said source.

* * * * *